June 19, 1945. D. F. LINSLEY 2,378,417
SHOCK ABSORBER
Filed Jan. 30, 1943
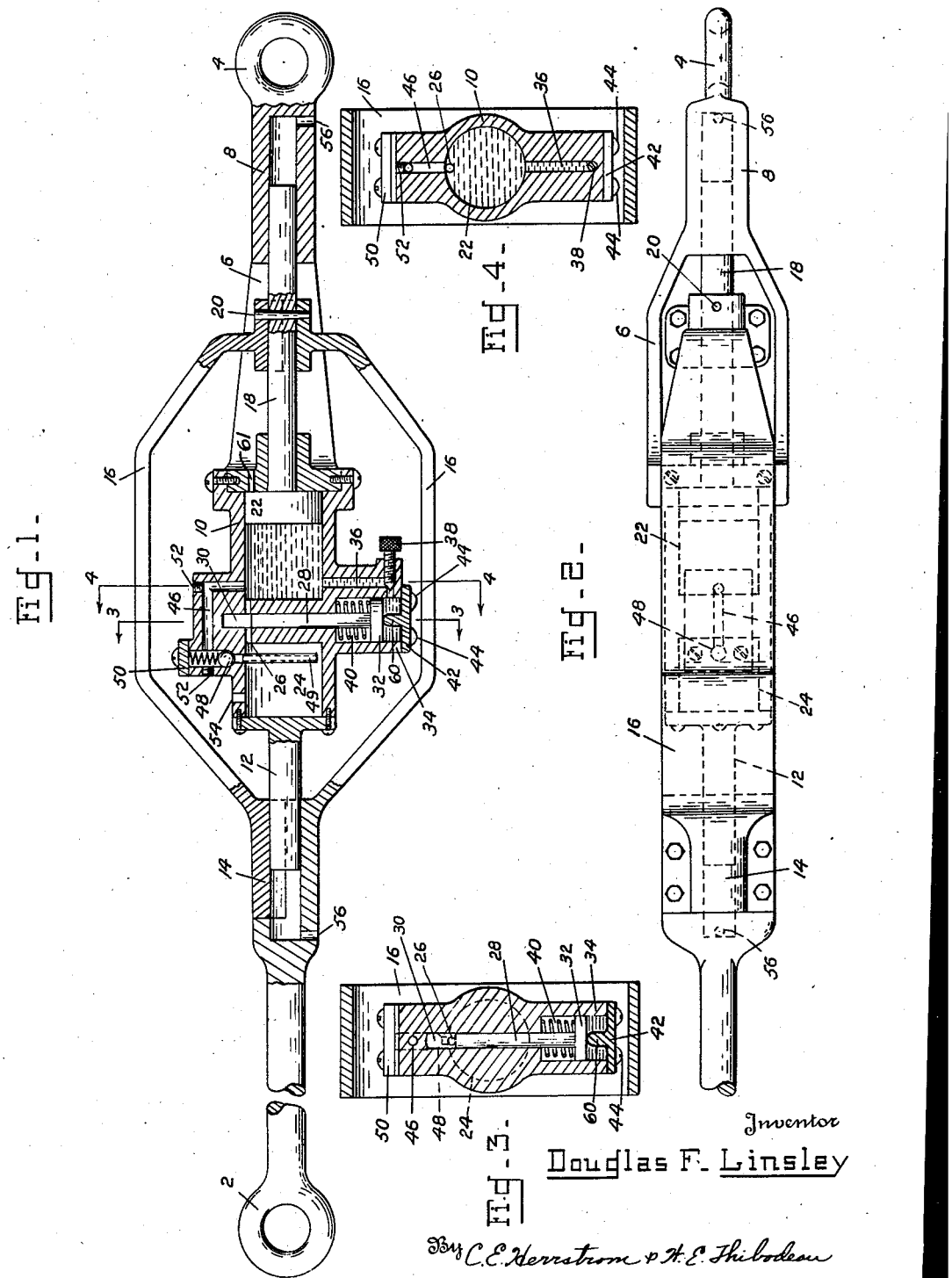
Inventor
Douglas F. Linsley
By C. E. Herrstrom & H. E. Thibodeau
Attorneys Patented June 19, 1945

2,378,417

UNITED STATES PATENT OFFICE 2,378,417

SHOCK ABSORBER

Douglas F. Linsley, Greenwich, Conn.

Application January 30, 1943, Serial No. 474,184

1 Claim. (Cl. 280—33.9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorbing tow bar which may be used by prime movers in towing trailers such as guns and like loads.

A tractor towing a trailer usually subjects the trailer to shocks of varying magnitude. Most of these shocks occur during acceleration or deceleration of the tractor, although of course they are not limited in their occurrence to those events. Such shocks can do considerable damage to both the tractor and its trailer.

It is the principal object of this invention to provide a tow bar capable of absorbing sudden shocks without transmitting those shocks through the bar to the member at the end opposite the one where the shock started. The object is accomplished by a fluid pressure cylinder associated with one end, or coupler member, of the bar, and a cooperating piston associated with the opposite end. An escape passage from the cylinder regulates the rate at which the piston moves in the cylinder. A valve in the escape passage is responsive to the pressure in the cylinder.

Figure 1 of the drawing is a view in elevation, with parts broken away and in section, of a tow bar made according to the invention.

Figure 2 is a plan view of the tow bar.

Figure 3 is a view in section on line 3—3 of Figure 1.

Figure 4 is a view in section on line 4—4 of Figure 1.

Referring to the drawing in detail, a tow bar is shown having the loosely joined ends, or coupler members, 2 and 4. To the coupler 4 is secured a yoke 6 by means of a shank 8. The yoke carries and is secured to one end of a fluid pressure cylinder 10, the other end of which is supported by a guide rod 12 slidably engaging shank 14 of coupler 2.

To coupler 2 is secured, by way of shank 14, a frame 16 which encircles cylinder 10. A piston rod 18 is held against movement in the frame by any suitable means such as the pin or key 20. A piston 22 on the rod cooperates with cylinder 10. The other end of the rod is slidably received in shank 8 of coupler 4.

Cylinder 10 carries a pressure fluid reservoir 24 which communicates with the cylinder by means of an escape passage 26. A valve 28 movable in a bore 30 substantially at right angles to passage 26 enables restriction of the passage. Valve 28 is actuated by a piston 32 movable in a cylinder 34, which communicates with cylinder 10 by way of a passage 36. Passage 36 is preferably provided with a needle valve 38. A spring 40 biases valve 28 toward the open position. Movement of the piston 32 under the action of spring 40 is limited by stop 60 which prevents the piston from covering the entrance of port 36 into the cylinder. Access to the interior of cylinder 34 is provided by any suitable cap or head 42 removably held in place by screws 44.

An auxiliary passage 46 is provided to communicate reservoir 24 with cylinder 10, with a check valve 48 to prevent flow from cylinder 10 to the reservoir. A pipe 49 carries passage 46 down to a point near the bottom of reservoir 24, to permit passage 46 to function when a liquid is used. A cap 50 gives ready access to the check valve. For convenience in manufacture, passage 46 may be made up of two intersecting holes bored or drilled or otherwise formed straight through from the walls of the device. One of these holes is aligned with passage 36 so as to enable the drilling of passage 36. The external openings thus made in the walls may be filled up by plugs 52. To permit free flow of fluid into and out of reservoir 24, a vent hole 54 is preferably provided in the reservoir.

Shanks 8 and 14 are preferably provided with vents 56 to give free play to rods 18 and 12 respectively, and a vent 61 is provided in the cylinder 10 back of the piston 22 to facilitate relative movement between the cylinder and the piston.

Operation.—Assuming an equilibrium condition exists, let it be supposed that coupler member 4 is accelerated. Cylinder 10 is pulled quickly to the right, as seen in Figure 1. The piston tends to compress the fluid in the cylinder, forcing some of it out through escape passage 26. If the acceleration is violent, so that the piston would quickly travel through the cylinder and might damage the parts by sudden contact with the cylinder end, the pressure in cylinder 10 rises sufficiently to force piston 32 against the bias of spring 40, cutting off the escape of fluid from cylinder 10. Shock then is absorbed entirely by compression of the fluid in cylinder 10.

The action is similar, of course, if coupler 2 is accelerated to the left as seen in Figure 1.

If the couplers are pushed together, with the parts in the position shown in Figure 1, the tow bar acts as a solid member. But if piston 22 is at the left end of cylinder 10 when the couplers are pushed together, piston 22 will move toward the other end of the cylinder and fluid will flow from the reservoir into the cylinder by way of passages 26 and 46.

I claim:

In the combination of a tow bar having a pair of coupler members, and a shock absorber mounted therebetween to resist tension, the improvement which consists in a cylinder, a piston movably mounted within said cylinder, a piston rod extending from said piston, one of said coupler members having a shank with a cylindrical bore therein, a yoke extending from said shank and encircling said cylinder, the outer end of said yoke being secured to said piston rod intermediate the ends of the latter so that a portion of said piston rod extends beyond the outer end of the yoke, said cylinder having a tail piece slideably engaged in the bore in said coupler shank, the other of said coupler members also having a shank with a cylindrical bore therein, a yoke extending from said last mentioned coupler shank and encircling the outer end of said first mentioned yoke and secured to said cylinder, the portion of said piston rod extending beyond the outer end of said first mentioned yoke being slideably engaged in the bore in said last mentioned coupler shank, a reservoir chamber associated with said cylinder, a restricted passage between said cylinder and said reservoir, and a valve adapted to be operated by the pressure in said cylinder to close said restricted passage upon relative movement between said coupler members.

DOUGLAS F. LINSLEY.